(12) United States Patent
Seo et al.

(10) Patent No.: US 9,043,182 B2
(45) Date of Patent: May 26, 2015

(54) ABSOLUTE POSITION MEASUREMENT APPARATUS AND METHOD

(75) Inventors: Yuzo Seo, Kamakura (JP); Chidane Ouchi, Utsunomiya (JP); Takao Ukaji, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 12/676,002

(22) PCT Filed: Nov. 18, 2008

(86) PCT No.: PCT/JP2008/071273
§ 371 (c)(1),
(2), (4) Date: Mar. 2, 2010

(87) PCT Pub. No.: WO2009/066781
PCT Pub. Date: May 28, 2009

(65) Prior Publication Data
US 2010/0235137 A1    Sep. 16, 2010

(30) Foreign Application Priority Data

Nov. 22, 2007 (JP) .................. 2007-302652

(51) Int. Cl.
*G01C 9/00*     (2006.01)
*G01B 9/02*     (2006.01)

(52) U.S. Cl.
CPC ........ *G01B 9/02083* (2013.01); *G01B 9/02007* (2013.01); *G01B 2290/70* (2013.01)

(58) Field of Classification Search
CPC ........... G01B 9/02007; G01B 9/02083; G01B 2290/70
USPC .................................. 702/152; 356/493, 499
See application file for complete search history.

(56) References Cited

U.S. PATENT DOCUMENTS

| | | | |
|---|---|---|---|
| 7,551,290 B2 | 6/2009 | Kadowaki et al. | |
| 7,554,671 B2* | 6/2009 | Kadowaki et al. | ............ 356/493 |
| 2003/0112444 A1 | 6/2003 | Yang et al. | |
| 2004/0095583 A1* | 5/2004 | Tamiya et al. | ................ 356/499 |
| 2005/0057756 A1 | 3/2005 | Fang-Yen et al. | |
| 2007/0024862 A1 | 2/2007 | Kadowaki et al. | |
| 2007/0024863 A1 | 2/2007 | Kadowaki et al. | |

FOREIGN PATENT DOCUMENTS

| | | |
|---|---|---|
| EP | 1748276 A1 | 1/2007 |
| EP | 1748277 A1 | 1/2007 |

(Continued)

OTHER PUBLICATIONS

Feb. 17, 2009 International Search Report and Written Opinion in PCT/JP2008/071273.

*Primary Examiner* — Tung S Lau
*Assistant Examiner* — Xiuquin Sun
(74) *Attorney, Agent, or Firm* — Fitzpatrick, Cella, Harper & Scinto (57) ABSTRACT

An absolute position measurement apparatus measures an absolute position of an object to be measured using a first light source and a second light source which has coherency lower than that of the first light source. The absolute position measurement apparatus includes a measurement part which measures a point where phases of interference signals from the first and the second light sources coincide with each other or a point where an intensity of the interference signal from the second light source is maximized, an origin defining part which defines the point measured by the measurement part as an origin position, a phase storing part which stores the phase of the interference signal from the first light source at the origin position, an origin redefining part which redefines the origin position, and a position calculating part which calculates the absolute position of the object to be measured.

9 Claims, 7 Drawing Sheets

(56) References Cited

FOREIGN PATENT DOCUMENTS

| JP | 7-190712 A | 7/1995 |
| JP | 2005-513429 A | 5/2005 |
| JP | 2007-33317 A | 2/2007 |
| JP | 2007-33318 A | 2/2007 |
| JP | 2007-524075 A | 8/2007 |
| WO | 03/052345 A1 | 6/2003 |
| WO | 2005/001445 A2 | 1/2005 |

* cited by examiner

ABSOLUTE POSITION MEASUREMENT APPARATUS AND METHOD

TECHNICAL FIELD

The present invention relates to an absolute position measurement apparatus, and more particularly to an absolute position measurement apparatus such as a laser interferometer which has an origin detecting function using two light sources and a measurement method using the measurement apparatus.

BACKGROUND ART

An ordinary laser interferometer does not have a detector of an origin position and it can only perform a relative displacement measurement. On the other hand, Japanese Patent Laid-Open Nos. 2007-33317 and 2007-33318 disclose a laser interferometer which has an origin detector. In the method proposed in these references, in addition to a first light source for measuring a position, a second light source whose wavelength or coherency is different from that of the first light source is used. The laser interferometer is provided with the origin detector which defines either one of a point where the phases of each of the interference signals obtained from these two light sources coincide with each other or a point where an intensity of the interference signal obtained from the light source which has low coherency is maximized as an origin.

However, while the position measurement using the first light source is performed with extremely high accuracy, it is difficult to measure the origin position with high accuracy even if it is measured based on the point where the phases coincide with each other or the point where the interference signal is maximized. Therefore, there was a problem that the reproducibility of the origin position was considerably inferior compared to the resolution of the first light source.

This problem can be solved by improving the measurement accuracy of the origin position by defining a point where the phase of the interference signal obtained from the first light source is a certain value, for example zero, as an option of the origin and by defining the option of the origin which is the closest to the measured origin described above as the origin.

If the interferometer is an ideal one, a path of light reflected by a reference mirror and a path of light reflected by a target mirror are symmetrically constituted and there is a position where optical paths are identical for all wavelengths. However, in the interferometer which is industrially used, the thickness of a glass material included in both optical paths is different because of an error of the thickness of a prism and the like. There is also a problem that the variation of the wavelength causes the change of the relationship between the measured origin position and the phase of the interference signal obtained from the first light source.

When the measured origin position is positioned at an intermediate position of two options of the origin which are determined from the first light source, it can not be determined which option may be selected as the origin. There was also a problem that either one of the two options of the origin adjacent to each other was selected as the origin at random, and as a result, the origin position was significantly varies.

DISCLOSURE OF INVENTION

The present invention provides an apparatus which can perform an origin measurement with the same position accuracy as that of the case of using the first light source and the origin position does not vary in accordance with the variation of the wavelength. In other words, the present invention provides an absolute position measurement apparatus which can reproducibly determine the origin position.

An absolute position measurement apparatus as one aspect of the present invention is an absolute position measurement apparatus configured to measure an absolute position of an object to be measured using a first light source and a second light source which has coherence lower than that of the first light source. The absolute position measurement apparatus includes a measurement part configured to measure at least one of a point where a phase of an interference signal obtained from the first light source coincides with a phase of an interference signal obtained from the second light source and a point where an intensity of the interference signal obtained from the second light source is maximized, an origin defining part configured to define the point measured by the measurement part as an origin position, a phase storing part configured to store the phase of the interference signal obtained from the first light source at the origin position, an origin redefining part configured to calculate the origin position using a measurement result measured by the measurement part after position information of the origin position is cleared, the interference signal obtained from the first light source, and the phase stored in the phase storing part in order to redefine the origin position, and a position calculating part configured to calculate the absolute position of the object to be measured using the interference signal generated by light from the first light source based on the redefined origin position.

An absolute position measurement method as another one aspect of the present invention is an absolute position measurement method for measuring an absolute position of an object to be measured using an interference signal generated by light from a first light source, the absolute position measurement method includes an origin defining step of calculating at least one of a point where a phase of an interference signal obtained from the first light source coincides with a phase of an interference signal obtained from a second light source and a point where an intensity of the interference signal obtained from the second light source is maximized and defining the calculated value as an origin position, a phase storing step of storing the phase of the interference signal obtained from the first light source at the origin position, an origin redefining step of calculating, after the origin position is cleared, at least one of a point where the phase of the interference signal obtained from the first light source coincides with the phase of the interference signal obtained from the second light source whose coherency is lower than that of the first light source and a point where the intensity of the interference signal obtained from the second light source is maximized, and redefining the point which is the closest to the calculated value and at which the phase of the interference signal obtained from the first light source coincides with the phase stored in the phase storing step as the origin position, and a step of calculating the absolute position of the object to be measured using the interference signal generated by the light from the first light source based on the redefined origin.

Further features and aspects of the present invention will become apparent from the following description of exemplary embodiments with reference to the attached drawings.

BEST MODE FOR CARRYING OUT THE INVENTION

Exemplary embodiments of the present invention will be described below with reference to the accompanied drawings.

Figure 8:
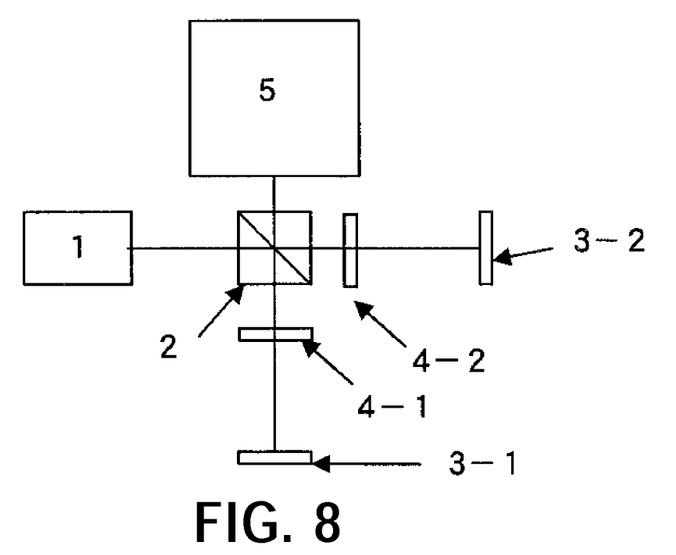
FIG. 8 is a configuration diagram of a main part of a common laser interferometer.

FIG. 8 is a configuration diagram of a main part of a common laser interferometer. Light that has been emitted from a light source 1 is divided by a polarization beam splitter 2. The divided lights are reflected by a reference mirror 3-1 and a target mirror 3-2, respectively. Each of lights reflected by these mirrors is synthesized by the polarization beam splitter 2 again. The synthesized light is an interference signal to be detected by an interference signal detector 5.

Thus, the phase difference of the lights reflected by the reference mirror 3-1 and the target mirror 3-2, respectively, is outputted as a phase of the interference signal. Quarter wavelength plates 4-1 and 4-2 which are inserted in both optical paths, respectively, are inserted in order to invert the transmission and the reflection by the polarization beam splitter 2.

Figure 9:
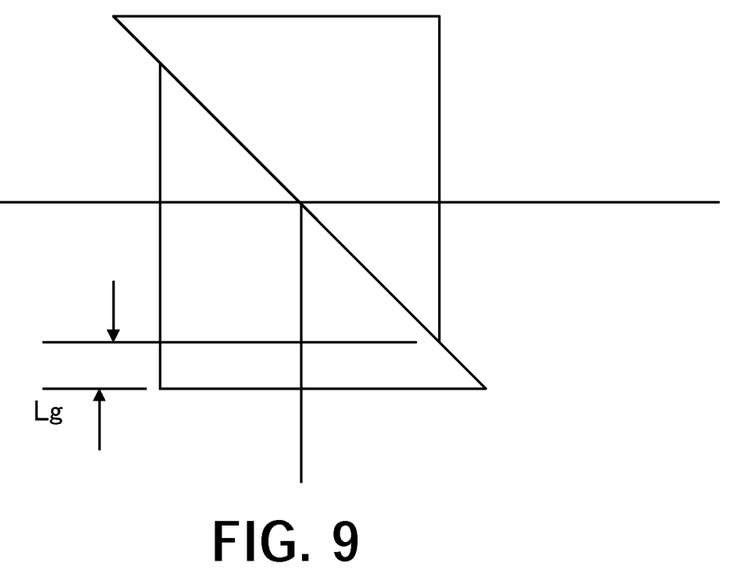
FIG. 9 is one example of a prism whose thickness contains an error.

FIG. 9 shows the case where the thickness of the prism which constitutes the polarization beam splitter 2 contains an error. It is ideal that the length of the optical path of the light reflected by the reference mirror 3-1 and the length of the optical path of the light reflected by the target mirror 3-2 are equal to each other. Actually, however, because of the manufacturing error of the prism as shown in FIG. 9 and the like, the lengths of the optical paths of the lights reflected by the reference mirror 3-1 and the target mirror 3-2 are different by length Lg. Thus, when a wavelength is different, positions where the lengths of the optical paths are equal to each other are also different. Therefore, the phase of the interference signal is influenced by the wavelength.

However, in a laser interferometer, there is only one point where the interference signal is not easily influenced by the wavelength of the light source. This will be described as follows.

It is assumed that a glass material transmitting part whose optical path at the side of the light reflected by the reference mirror 3-1 is length Lg longer, compared to the optical path of the light reflected by the target mirror 3-2. Furthermore, it is assumed that an air transmitting part whose optical path at the side of the light reflected by the target mirror 3-2 is length La longer, compared to the optical path of the light reflected by the reference mirror 3-1. In this case, the phase difference of the light which reflects both mirrors, i.e. the phases of the interference signals are calculated by expressions (1) and (2).

$$\phi 1 = 2(n1 \cdot Lg - La)/\lambda 1 \quad (1)$$

$$\phi 2 = 2(n2 \cdot Lg - La)/\lambda 2 \quad (2)$$

Thus, the phase of the interference signal is $\phi 1$ when the wavelength of the light source is $\lambda 1$ (refractive index: n1), and the phase of the interference signal is $\phi 2$ when the wavelength of the light source is $\lambda 2$ (refractive index: n2). If the wavelength of the light source varies from $\lambda 1$ to $\lambda 2$, the phase variation of the interference signal is represented by expression (3).

$$\phi 2 - \phi 1 = 2\Delta\lambda/\lambda 1 \cdot \lambda 2 (La - Lg \cdot ng) \quad (3)$$

Here, ng is a refractive index which is defined as $[n1 - \lambda 1 dn/d\lambda]$. The refractive index ng corresponds to a refractive index obtained by extrapolating the value which is obtained by linearly approximating the refractive index between the wavelength $\lambda 1$ and the wavelength $\lambda 2$ to wavelength zero. If the wavelength $\lambda 1$ and the wavelength $\lambda 2$ are close, the dispersion between them, i.e. rate of the change of the refractive index with respect to the wavelength, can be assumed to be constant. This approximation works with high accuracy.

In view of expression (3), at a certain point where $[La = Lg \cdot ng]$ is satisfied, it is recognized that the right side is zero. Lg is a thickness of the glass material extra contained at the optical side of the light which is reflected by the reference mirror 3-1. ng is a constant which is determined based on material properties. Thus, La is a constant which is not influenced by the wavelength and is peculiar to the apparatus. Therefore, La is a point suitable for an origin of the laser interferometer.

Since the interference signal is not influenced by the wavelength of the light source at this point, when the interference signal is obtained by using two light sources whose wavelengths are different, both phases coincide with each other at this point. This point is, as disclosed in Japanese Patent Laid-Open No. 2007-33318, an ideal origin. The light source whose coherency is low contains a various kind of lights whose wavelengths are different (light which has a wide bandwidth), the intensity of the interference signal is maximized at the point where all of the interference signals coincide with one another. Therefore, as disclosed in Japanese Patent Laid-Open No. 2007-33317, this point is also an ideal origin.

However, there is a problem that since the phase difference of the interference signals obtained from two light sources which have wavelengths close to each other is low in rate of change with respect to a position, the point where the phase difference is zero significantly varies even if a small phase arithmetic error occurs. It is also difficult to obtain a position of the point where the intensity of the interference signal of the light source which has low coherency is maximized with high accuracy. In other words, although the method disclosed in Japanese Patent Laid-Open Nos. 2007-33317 and 2007-33318 is a method for searching "an ideal origin in principle", in view of the reproducibility in defining the origin a number of times, the accuracy was not sometimes enough.

On the other hand, in the laser interferometer, if the detection of the interference signal is lost by stopping the emission of the laser and the like, the reliability of the position information of the origin is lost. Therefore, the position needs to be defined for each start of the apparatus. Thus, there is a problem of how to reproducibly define the origin.

By the way, the phase of the interference signal obtained from the first light source which has high coherency can be calculated with extremely high accuracy and reproducibility. However, because the unevenness of the thickness of the glass material and the dispersion exist, this phase and the ideal origin position can significantly vary.

In the present embodiment, in measuring the origin at first after forming the apparatus such as a laser interferometer, either one of a point where the phases of each of the interference signals obtained from the two light sources coincide with each other or a point where the intensity of the interference signal obtained from the light source which has low coherency is maximized is defined as an origin. The phase of the interference signal obtained from the first light source at the origin at this time is permanently stored.

In performing the origin detection after that such as the case where the power of the apparatus starts again and the like, the origin is defined as follows. In other words, similarly to the case of performing the first origin measurement, either one of the point where the phases of each of the interference signals obtained from the two light source coincide with each other or the point where the intensity of the interference signal obtained from the light source which has low coherency is maximized (the point defined as a origin at the first origin measurement) is obtained. The point which is the closest to this point and in which the phase of the interference signal obtained from the first light source coincides with the stored value is defined as the origin.

In other words, the origin definition is performed based on the phase of the interference signal obtained from the first light source which has a high reproducibility. However, a plurality of the points where this phase coincides with the stored phase exist for every $2\pi$ cycle. Therefore, in the present embodiment, "the point where the phases of each of the interference signals obtained from the two light source coincide with each other" or "the point where the intensity of the interference signal obtained from the light source which has low coherency is maximized" is obtained. Furthermore, the point which is the closest to this point and in which the phase of the interference signal obtained from the first light source coincides with the stored phase is obtained. Such a method can unambiguously determine a certain point from among the points where the plurality of the phases coincide with the stored phase.

Therefore, even if the reproducibility of the point where the phases of each of the interference signals obtained from the two light sources coincide with each other or the point where the intensity of the interference signal obtained from the light source which has low coherency is maximized is not enough, the phase of the interference signal obtained from the first light source can be reproducibly obtained. In other words, even if the point slightly varies in a range of one cycle of the phase of the interference signal obtained from the first light source, the phase of the interference signal can be reproducibly obtained. As a result, the origin can be reproducibly defined.

The same function can also be realized by performing the origin measurement after forming the apparatus, obtaining the phase at the origin of the interference signal obtained from the first light source, and always adding this value to the calculated result at an output part of a phase arithmetic unit.

According to such a method, the origin can be obtained with high accuracy and reproducibility by defining the origin as an ideal position which is not influenced by the variation of the wavelength, and on the other hand, by determining the origin based on the interference signal obtained from the first light source.

Figure 10:
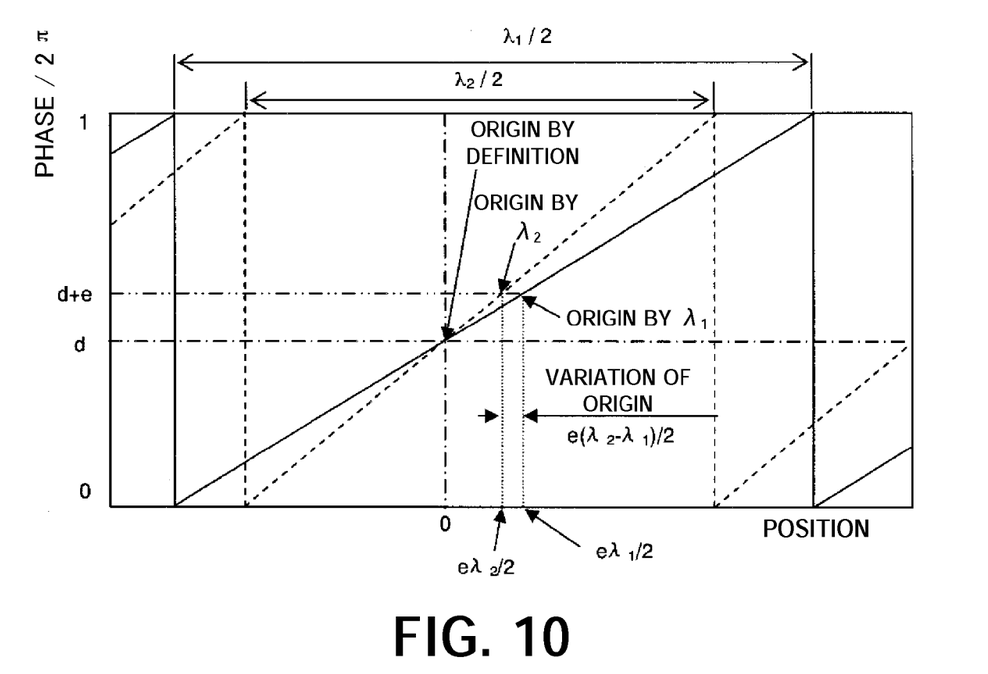
FIG. 10 is an illustration of an origin position when a light wavelength varies.

FIG. 10 is an illustration of an origin position when a light wavelength has varied. The vertical axis represents a phase of an interference signal, and the horizontal axis represents a position. The solid line represents a phase of the interference signal with respect to the position when the wavelength of the light source is $\lambda 1$. The dotted line represents a phase of the interference signal with respect to the position when the wavelength of the light source is $\lambda 2$.

When a point where the interference signal does not change even if the wavelength changes is defined as an origin, the intersection point of the straight lines of the wavelengths $\lambda 1$ and $\lambda 2$ is the origin. At this intersection point, the phase of the interference signal is constant with respect to a light source which has any wavelength. Therefore, when phase d which is regarded as the origin is determined, there is no need to change this phase even if the wavelength of the light source varies.

If there is an error e in a predefined phase and the phase d+e is defined as an origin, the origin moves by the change of the wavelength of the light source. However, in the vicinity of the origin, the displacement of the position with respect to the change of the wavelength is enough small. For example, in a once reflective laser interferometer whose wavelength of the light source is 80 nm, if the measurement error of the origin is 1% with respect to cycle 400 nm of the interference signal, the reproducibility of the origin is 4 nm when the measurement result is used as it is. Since the phase accuracy of the interference signal is commonly around 1/1000 of the signal wavelength, the reproducibility of around 0.4 nm is expected. Therefore, when the point where the phase difference is zero is simply defined as the origin, the reproducibility of the origin is inferior to the measurement accuracy of the interferometer by one digit.

According to the method of the present embodiment, if the origin position defined after assembling the apparatus contains an error of 1% of one cycle of the interference signal, for example, the wavelength of the light source varies by 10 nm, the variation of the original position is only 0.05 nm. Therefore, the origin position can be obtained with sufficiently high reproducibility with respect to the measurement accuracy of the interferometer.

Embodiment 1

Next, the configuration of Embodiment 1 of the present invention will be described.

Figure 1:
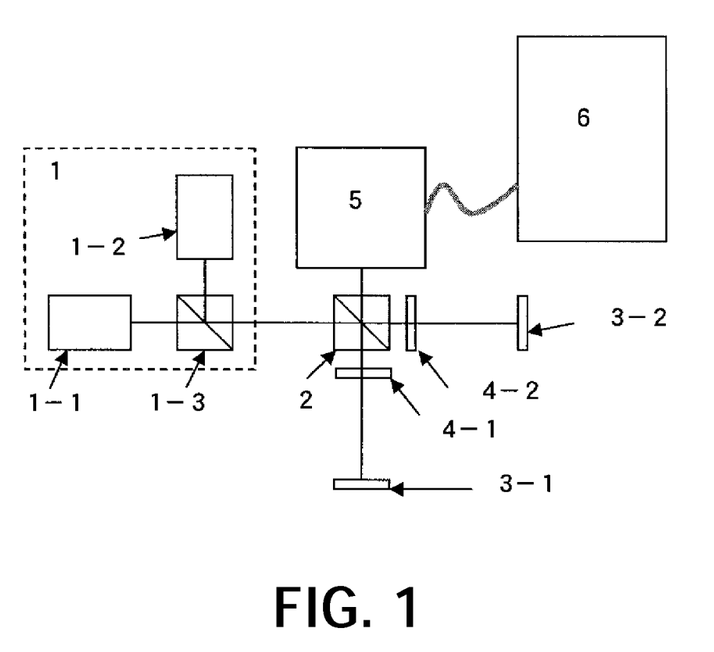
FIG. 1 is an overall view of a configuration of a laser interferometer in Embodiment 1.

FIG. 1 is an overall view of a configuration of a laser interferometer in Embodiment 1. The laser interferometer is shown as one example of an absolute position measurement apparatus which determines an origin position of an object to be measured (a target) using a first light source and a second light source which has a wavelength or coherency different from that of the first light source.

A light source 1 includes a surface-emitting laser diode 1-1, a high-intensity LED 1-2, and a dichroic mirror 1-3. The surface-emitting laser diode 1-1 is used as a first light source which has high coherency and emits light of wavelength 850 nm. The high-intensity LED 1-2 is used as a second light source which has coherency lower than that of the first light source and emits light of wavelength 830 nm. The lights emitted from the surface-emitting laser diode 1-1 and the high-intensity LED 1-2 are synthesized by the dichroic mirror 1-3.

The surface-emitting laser diode 1-1 is connected to a power supply circuit (not shown) and continuously lights up. On the other hand, the high-intensity LED 1-2 is ordinarily turned off. The high-intensity LED 1-2 is configured to turn on and off based on the signal from a signal processing unit 6 when an origin is defined.

Light emitted from the light source 1 is split by a polarization beam splitter 2. The split lights are reflected by a reference mirror 3-1 and a target mirror 3-2, respectively. The lights reflected by these mirrors are synthesized by the polarization beam splitter 2 again. The synthesized light is an interference signal and is detected and converted into an electric signal by an interference signal detector 5 to be introduced into the signal processing unit 6. Quarter wavelength plates 4-1 and 4-2 are inserted in both optical paths, and invert the transmission and the reflection by the polarization beam splitter 2.

Figure 2:
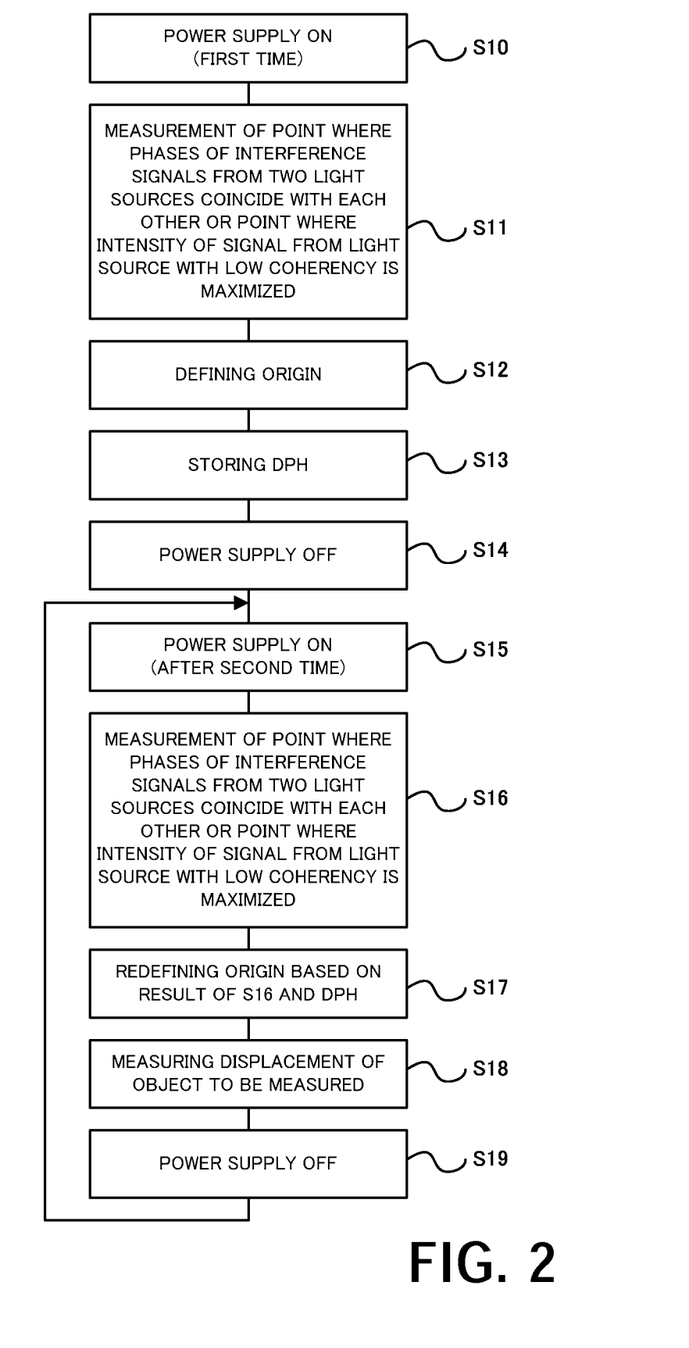
FIG. 2 is a flowchart of a defining method of an origin in Embodiment 1.

Next, a method for defining the origin in the laser interferometer of the present embodiment will be described with reference to a flowchart of FIG. 2.

First, the definition of the origin at the time of the first start after manufacturing the laser interferometer will be described.

The power supply is turned on (S10), subsequently, the high-intensity LED 1-2 as well as the surface-emitting laser diode 1-1 is turned on in order to define the origin. Next, the point where the phases of each of the interference signals obtained from the two light sources coincide with each other or the point where the intensity of the interference signal obtained from the high-intensity LED 1-2 which has low coherency is maximized is measured by a measurement part (S11). In the present embodiment, the measured point is defined as the origin of the laser interferometer (S12). In defining the origin after that, the apparatus aims to always specify this point and to define it as the origin.

Therefore, the phase at this point of the interference signal of the surface-emitting laser diode 1-1 which has a good reproducibility in phase is stored in a memory inside the signal processing unit 6 as a phase shift amount DPH (S13). Thus, the origin definition at the first time is completed and the power supply is turned off (S14).

Since the origin information of the laser interferometer is cleared when the power supply is turned off, the origin needs to be defined once again when the power supply is turned on again. In the origin definition after the second time (the origin redefinition), the point which is the same as the origin defined at the first time needs to be defined as the origin. In order to reproducibly define the origin, when defining the origin after the second time, the origin is defined using the phase shift amount DPH. The origin definition after the second time will be described as follows.

First, the power supply is turned on (S15). Using the same method as that of S11 at the first time of the origin definition, the point where the phases of each of the interference signals obtained from the two light sources or the point where the intensity of the interference signal obtained from the high-intensity LED 1-2 which has low coherency is maximized is measured (S16). If the reproducibility of the point obtained by this measurement is enough, an identical point can be obtained in S11 and S16. Actually, however, for the reasons above, the reproducibility of the point obtained by the measurement is not sometimes enough. In this case, the point obtained every measurement slightly varies and the reproducibility of the origin definition may decline.

Therefore, in the origin definition after the second time, the phase shift amount DPH stored inside the signal processing unit 6 as well as the measurement result in S16 is used for ensuring the reproducibility of the origin.

Specifically, the point where the phase of the interference signal of the surface-emitting laser diode 1-1 coincides with the phase shift amount DPH and which is the closest to the point obtained by the measurement in S16 is redefined as the origin (S17). The term "the closest" also includes the case where the point which coincides with the phase shift amount DPH coincides with the point obtained by the measurement in S16, i.e. the case where the measurement result in S11 coincides with that in S16.

Since the surface-emitting laser diode 1-1 has a good reproducibility of the phase, the phase at a certain point does not vary at every measurement and can be regarded to be substantially constant. Therefore, the point where the phase of the interference signal of the surface-emitting laser diode 1-1 coincides with the phase shift amount DPH is a point measured in S11 or a point which is away from this point by an integral multiple of the wavelength of the light source. In this case, by selecting the point which is the closest to the point obtained in S16, the point which is identical to the point measured in S11 can be specified. This point is the origin redefined in S17.

After redefining the origin, the displacement measurement of the object to be measured is performed (S18). After completing the step, the power supply is turned off (S19).

In defining the origin after that, by performing the origin definition from the step S15, the origin can be reproducibly defined and the absolute position of the object to be measured can be reproducibly measured.

Figure 3:
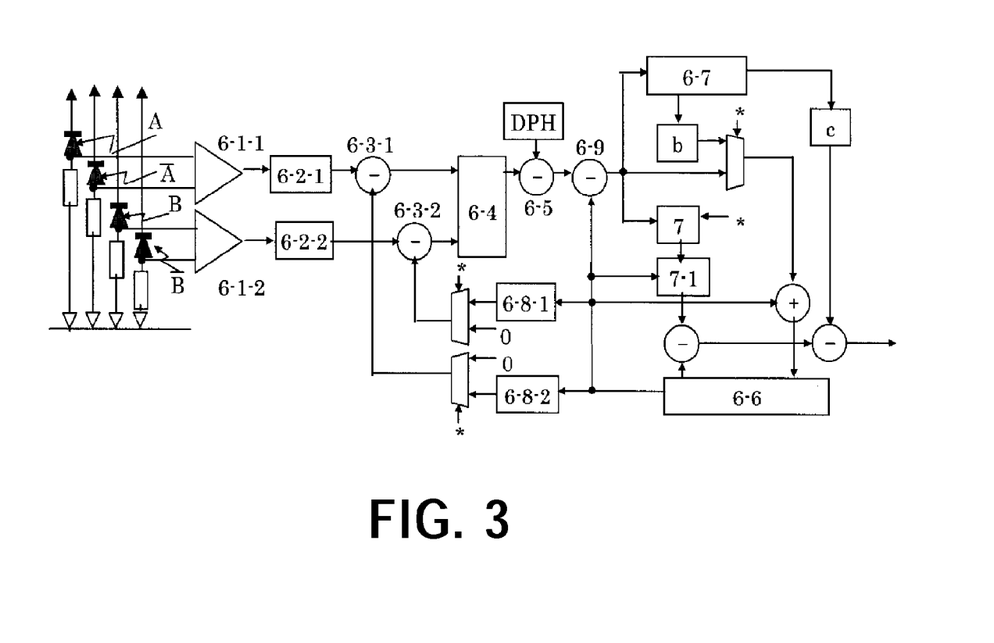
FIG. 3 is a block diagram of a signal processing unit in Embodiment 1.

Next, the signal processing unit 6 will be described in detail. FIG. 3 shows a block diagram of the signal processing unit 6.

Two interference signals A and B are inputted to the signal processing unit 6. The interference signal A is an interference signal obtained from the first light source, and the interference signal B is an interference signal obtained from the second light source. Since an inversion signal formed from each of the interference signals A and B as well as a normal signal is inputted to the signal processing unit 6, four interference signals in total are inputted to the signal processing unit 6.

The normal signal and the inversion signal of each of the interference signals A and B are differentially amplified by instrumental amplifiers 6-1-1 and 6-1-2. The differentially amplified interference signals A and B are converted into digital signals by A/D converters 6-2-1 and 6-2-2. While the high-intensity LED 1-2 is turned on, predicted values of the interference signals of the surface-emitting laser diode 1-1 is subtracted by subtractors 6-3-1 and 6-3-2. The predicted values of the interference signals of the surface-emitting laser diode 1-1 are calculated by prediction units 6-8-1 and 6-8-2. Multiplexers provided at the subsequent stage of the prediction units 6-8-1 and 6-8-2 select the signals of the prediction units 6-8-1 and 6-8-2 and output the signals to the subtractors 6-3-1 and 6-3-2.

A phase arithmetic unit 6-4 removes a distortion of the inputted interference signal by a conventional method and calculates a phase angle. The phase arithmetic unit 6-4 outputs a phase of the interference signal with respect to the second light source during the lighting period of the high-intensity LED 1-2 that is the second light source. On the other hand, the phase arithmetic unit 6-4 outputs a phase of the interference signal with respect to the first light source during the period in which only the surface-emitting laser diode 1-1 that is the first light source lights. The output of the phase arithmetic unit 6-4 is introduced to the subsequent stage through a subtractor 6-5 that subtracts the phase shift amount DPH that is a constant value. The subtractor 6-5 is used as a phase difference calculating part which calculates the phase difference between the phase of the interference signal obtained from the first light source and the phase stored in a memory 7-4.

A register 6-6 which holds an upper digit extended value of the phase of the interference signal of the first light source is provided in the signal processing unit 6. While only the first light source lights, a subtractor 6-9 subtracts a part corresponding to the phase of the interference signal of the register 6-6 from the output of the subtractor 6-5. The sign of this value is extended to the width of the register 6-6 and the value is added to the register 6-6. The register 6-6 is a position calculating part which calculates an absolute position of the object to be measured using the interference signal generated by the light from the first light source based on the origin position redefined by an origin redefining part. The register 6-6 calculates the absolute position of the object to be measured based on the phase difference calculated by the subtractor 6-5 that is a phase difference calculating part.

On the other hand, while only the first light source lights, the amount of the phase variation of the interference signal from the first light source is processed by a Kalman filter 6-7 to calculate the velocity and the noise component. The Kalman filter 6-7 is a dynamic linear regression arithmetic unit that performs an exponential weighting.

Figure 4:
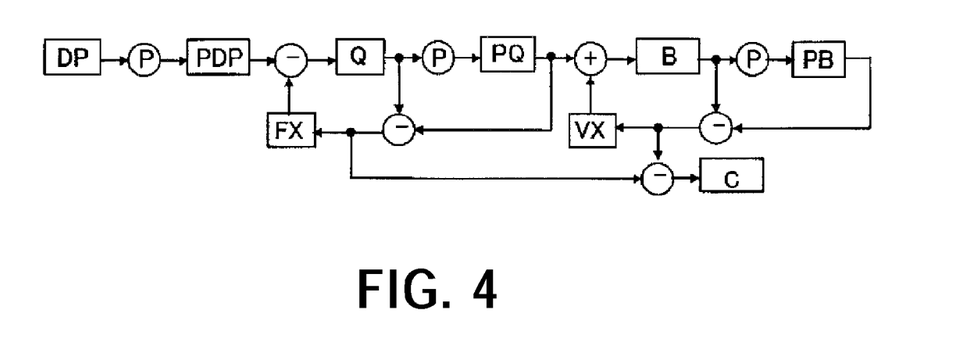
FIG. 4 is a block diagram of a Kalman filter in Embodiment 1.

FIG. 4 shows a block diagram of the Kalman filter 6-7.

Reference mark DP is a difference between the latest phase and the previous phase of the interference signal with respect to the first light source. Reference mark PDP is a register for storing the difference DP of the phase. The register PDP performs a shift to the right by P bits and stores the difference DP of the phase.

The value obtained by subtracting the value of a register FX from the value of the register PDP is stored in a register Q. Next, the value obtained by shifting the value of the register Q by P bits to the right is stored in a register PQ. Furthermore, the value obtained by subtracting the value of the register PQ from the register Q is stored in the register FX.

The value obtained by adding the value of a register VX to the value of the register PQ is stored in a register B. The value of the register B is a value that corresponds to a velocity of the phase variation of the interference signal with respect to the first light source. While the second light source lights, the value is used for updating the phase of the interference signal with respect to the first light source.

The value obtained by shifting the value of the register B by P bits to the right is stored in a register PB. Next, the value obtained by subtracting the value of the register PB from the value of the register B is stored in the register VX.

The value C obtained by subtracting the value of the register VX from the value of a register FX is a constant term of the regression expression of the regression coefficient. This constant term can also be used for removing a noise contained in the phase of the interference signal with respect to the measured first light source.

When the Kalman filter 6-7 obtains an amount of a phase variation Δx, it performs the calculations shown in expressions (4) to (8) using values $f_x$ and $V_{x,k}$ held inside the filter. By these calculations, a velocity b and a noise c are obtained and the values $f_x$ and $V_{x,k}$ held inside the filter are updated.

$$q = f'_x - p\Delta x \tag{4}$$

$$b = V'_{x,k} + pq \tag{5}$$

$$V_{x,k} = (1-p)b \tag{6}$$

$$f_x = (1-p)q \tag{7}$$

$$c = f_x - V_{x,k} \tag{8}$$

Here, "'" represents the previous calculation. "p" is $2^{-n}$ and shows a weighting factor with respect to the latest phase angle.

While the second light source lights, the Kalman filter 6-7 does not update a value. Therefore, velocity b holds the value which was updated at the latest before turning the second light source on. The phase of the interference signal from the first light source is updated by adding the sign extended value of this value to the register 6-6. The estimate value of the interference signal from the first light source is calculated based on the phase information, the estimate values are subtracted from the outputs of the A/D converters 6-2-1 and 6-2-2 by the subtractors 6-3-1 and 6-3-2.

While the second light source lights, the difference between the output of the phase arithmetic unit 6-4 and the value held at a lower-level of the register 6-6 (a part corresponding to a phase) corresponds to the difference between the phase of the interference signal from the first light source and the phase of the interference signal from the second light source.

Immediately after the light source is turned on, ordinarily, a signal is not stable. Therefore, a control circuit (not shown) which controls to turn on and off of the second light source waits for a time which is necessary for the second light source to be stabilized, and immediately before turning off the light source, the control circuit outputs a phase difference picking command. By this command, the multiplication of the phase difference and the calculation of the number of the multiplication are performed.

Figure 5:
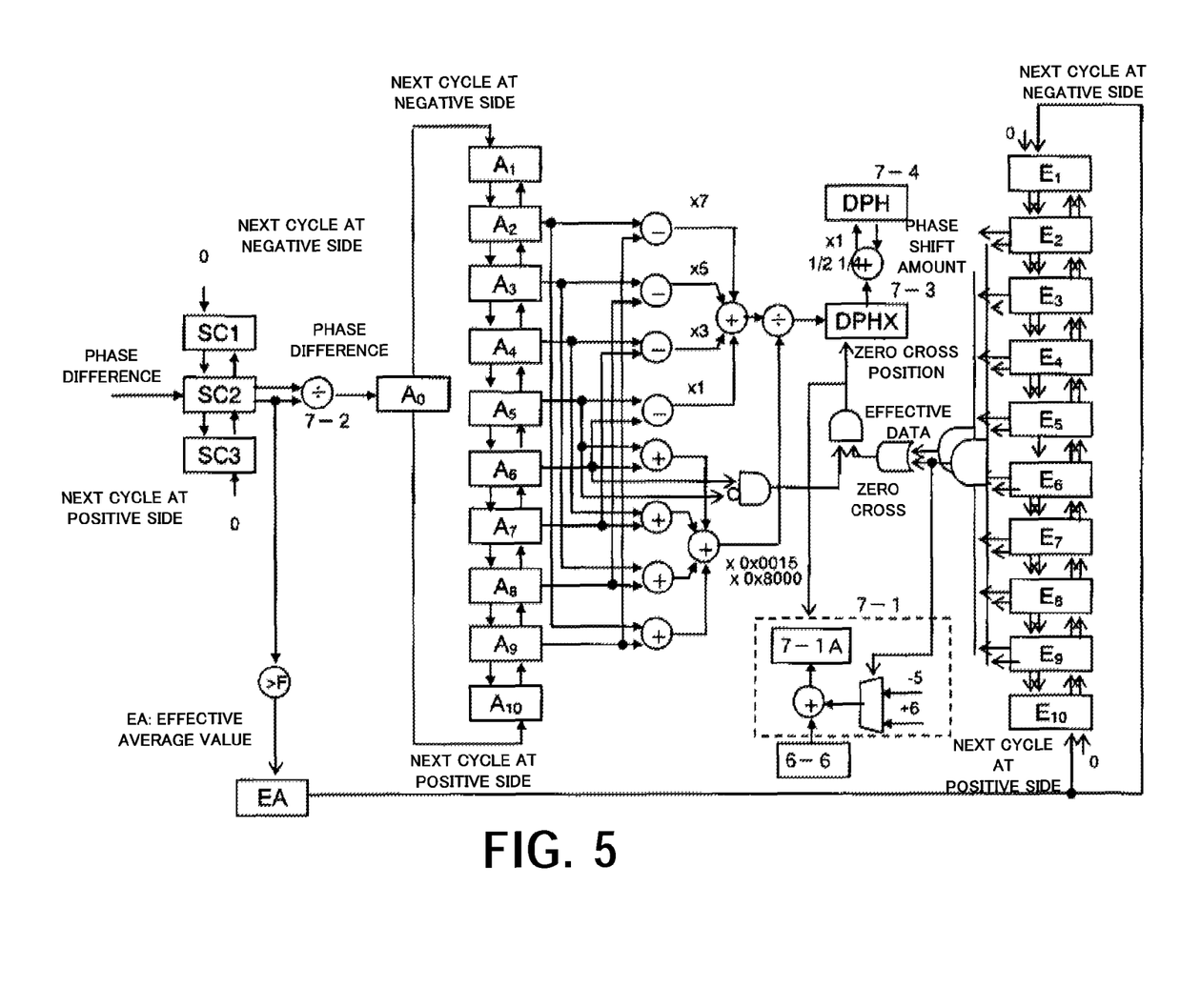
FIG. 5 is a block diagram of an origin defining part in Embodiment 1.

FIG. 5 is a block diagram of an origin defining part 7 in the present embodiment.

The origin defining part 7 defines a point measured by the measurement part, i.e. a point where a first phase of the interference signal obtained from the first light source coincides with a second phase of the interference signal obtained from the second light source, as an origin position.

The multiplication of the phase difference is performed for each cycle of the interference signal from the first light source. The phase of the interference signal can vary and vibrate in any directions. In order to unwastefully efficiently perform a multiplication in accordance with this, it is preferable that at least three groups of the multiplication area of the phase difference and the calculation area of the number of the multiplication (SC1 to SC3) are provided. Each area is configured to be able to mutually transfer data. Therefore, if the interference signal from the first light source varies across the cycles, the data is transferred in accordance with the direction of the variation and the area at the end is cleared to zero.

When the control circuit (not shown) generates the phase difference picking command and the multiplication of the phase difference and the calculation of the number of the multiplication is performed, the multiplication value is divided by the number of the multiplication by a divider 7-2 and the average value of the picked phase difference is calculated. This average value is stored in a register $A_0$. Furthermore, an average value effective flag EA representing that the number of the multiplication is equal to or greater than a predetermined value is held. When something is wrong, for example the amplitude of the signal is low, the multiplication is not performed. Therefore, when the number of the multiplication is equal to or greater than the predetermined value, the average value stored in the register $A_0$ is regarded to be effective.

The average value and the average value effective flag are held in memories (registers $A_1$ to $A_{10}$ and registers $E_1$ to $E_{10}$). The number of the memories is the number obtained by adding two to the number necessary to calculate the origin position, in accordance with the cycle of the interference signal from the first light source. The registers $A_1$ to $A_{10}$ average the phase difference between the first phase and the second phase for every cycle of the signal and hold the averaged phase difference.

With regard to the value held in these areas, similarly to the multiplication value and the like, the transfer of the data is performed in accordance with the direction of the variation when the interference signal from the first light source varies across the cycle. The registers $E_1$ to $E_{10}$ in which the flag representing that the average value is effective is held have a width of 2 bits so that values representing a position are held at different areas in accordance with the direction of the change, i.e. the increase or the decrease of the value.

The origin defining part 7 shown in FIG. 5 has a configuration that a linear regression of eight average values is performed, as one example. This is an example in the case where the origin position needs to be obtained with high accuracy. If the high accuracy is not required, the linear regression can be performed using the smaller number of average values or the origin position can also be calculated by complementing an average value of two points.

By performing the linear regression calculation with respect to the average values held in the registers $A_1$ to $A_{10}$, the position where the phase difference between the first phase and the second phase is zero is defined as the origin position.

The regression calculation is performed when all of the phase difference average values used for the calculation are effective data and the phase difference is crossed at zero at the center of the group of the registers which accumulate the phase difference average values. This condition is fulfilled when all of the average value effective flags EA corresponding to the average values used for the calculation represent 1 at the increase side or the decrease side of the position and the sign bit of the phase difference average value represents a negative value at the side where a value representing the position is smaller and represents a positive value at the side where a value representing the position is greater based on the central part.

As a result of the regression calculation, the zero cross position of the phase difference is calculated and the origin detecting flag is turned on. The upper value of the register 6-6 which corresponds to the center of the group of registers of the phase difference average value at this time is held in a register 7-1A. In an example of FIG. 5, five is subtracted from the upper value of the register 6-6 when the position is at the increase side, and six is added to the upper value of the register 6-6 when the position is at the decrease side. The calculated value is held in the register 7-1A.

The origin redefining part 7-1 calculates the origin position using the measurement result measured by the measurement part after the position information of the origin position is cleared, the interference signal obtained from the first light source, and the phase stored in the memory 7-4 (DPH) as a phase storing part to redefine the origin.

The absolute position of the object to be measured can be measured by subtracting the value held in the register 7-1A from the upper value of the register 6-6.

The phase difference zero cross position DPHX obtained by the regression calculation is held in a memory 7-3 (a register) and all or a part of them are added to a memory 7-4 (a register) which holds the phase shift amount DPH in accordance with a command from outside the origin defining part. Thus, the memory 7-4 is used as a phase storing part which stores the phase of the interference signal obtained from the first light source at the origin position defined by the origin defining part.

This command is supplied immediately after the apparatus is assembled. In order to obtain the phase shift amount DPH with higher accuracy, it is preferable that the phase shift amount DPH is averaged. As one example of the averaging, there is a method as follows, i.e. all amount of the phase difference zero cross position DPHX is added to the phase shift amount DPH at the first time of detecting the origin, half amount is added at the second time of detecting the origin, and ¼ is added at the third and fourth times. The phase shift amount DPH is transferred to a nonvolatile memory such as a PROM before cutting off the power supply of the origin defining part 7 or a host computer reads the value and it loads the value to the memory 7-4 again when the power supply is subsequently turned on.

Figure 6:
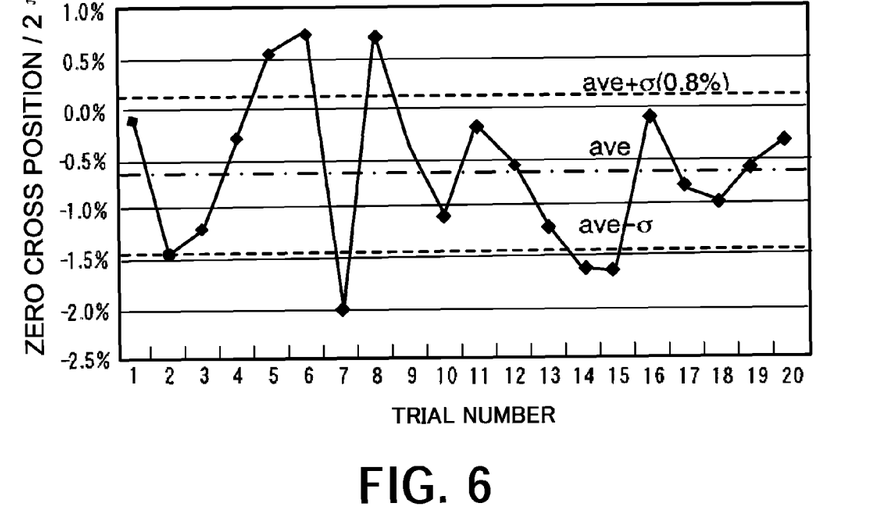
FIG. 6 is a diagram showing a measurement result of a variation of an origin position in Embodiment 1.

FIG. 6 is a diagram showing a measurement result of a variation of the origin position in the present embodiment. This measurement result represents a variation of the phase difference zero cross position when the regression is performed with eight points. The ratio of the variation for the cycle of the signal is equal to or smaller than 1% with a standard deviation. The variation of the origin position with respect to wavelength 10 nm is considered to be suppressed to equal to or smaller than 0.05 nm.

Embodiment 2

Figure 7:
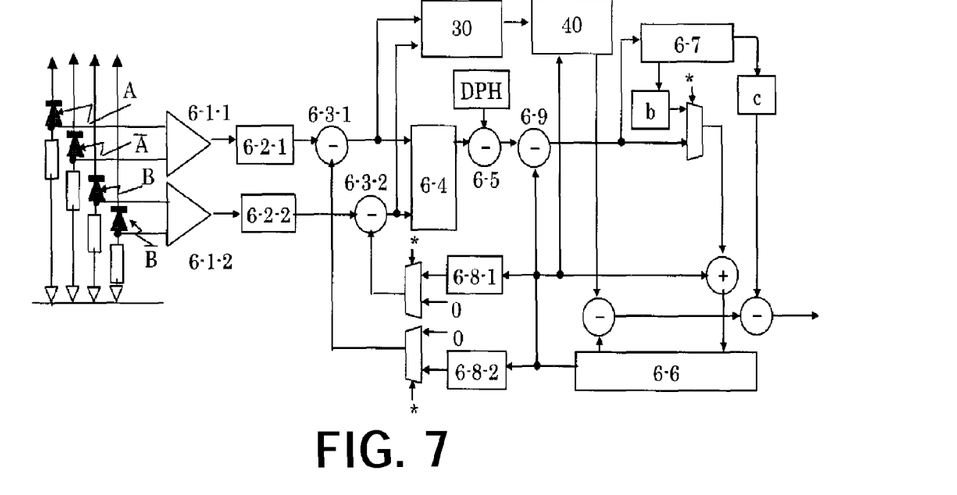
FIG. 7 is a block diagram of a signal processing unit in Embodiment 2.

Next, the configuration of Embodiment 2 of the present invention will be described in detail. Embodiment 2 is different from Embodiment 1 in the configuration of the signal processing unit 6. Since other configurations of Embodiment 2 are the same as those of Embodiment 1, the description of the configurations will be omitted.

FIG. 7 is a block diagram of the signal processing unit 6 in Embodiment 2. The signal processing unit 6 in the present embodiment includes a digital signal processor 40 (DSP). The digital signal processor 40 includes an origin defining part which defines a point where the intensity of the interference signal from the second light source is maximized as an origin position.

While the first light source and the second light source are superimposed, the signals outputted from subtractors 6-3-1 and 6-3-2 are inputted to an amplitude arithmetic unit 30. The amplitude arithmetic unit 30 calculates amplitude of the second light source. The amplitude value is calculated by squaring each of two input signals from the second light source and by extracting the square root of sum of these values. The amplitude value obtained in this way indicates a constant value without depending upon the phase, if the interference signal obtained from the second light source is a signal approximated by a sine wave. However, in the case where the signal has low coherency such as the interference signal obtained from the second light source, it has an amplitude value equal to or greater than a predetermined value only in the vicinity of an origin of the object to be measured. Therefore, it is technologically difficult to suppress the distortion of the signal by adjusting the gain, the offset, or the like, and each of the signals contain a great distortion. As a result, the amplitude value of the signal obtained from the calculation significantly varies with respect to the change of the phase, and an error occurs.

In this error, the same error is repeated for every cycle of the interference signal. Therefore, the error generated by the signal distortion can be efficiently removed by averaging the phase differences in one cycle of the signal. In other words, the peak position is calculated by obtaining average values of the amplitude of the interference signal obtained from the second light source for every cycle of the interference signal obtained from the first light source and by performing a quadratic regression calculation of these average values. The measurement part measures the peak position that is a point where the intensity of the interference signal obtained from the second light source is maximized. The origin defining part defines the peak position as the origin position of the object to be measured.

The interference signal obtained from the second light source has low coherency compared to the interference signal obtained from the first light source. Therefore, the amplitude value of the interference signal obtained from the second light source calculated by the amplitude arithmetic unit 30 significantly varies in accordance with the position or the angle of the object to be measured.

The amplitude value calculated by the amplitude arithmetic unit 30 is inputted to the digital signal processor 40. A wave number (a cycle) of the first signal held in the register 6-6 is inputted to the digital signal processor 40.

The digital signal processor 40 determines whether or not the amplitude value of the interference signal obtained from the second light source calculated by the amplitude arithmetic unit 30 is equal to or greater than the predetermined value. When the digital signal processor 40 determines the amplitude value is at least the predetermined value, it stores the amplitude value in an amplitude value storing area where the wave number (the cycle) of the interference signal obtained from the first light source is addressed and increments the amplitude value storing area by one. When a predetermined number, for example at least ten, of the amplitude values are stored in the amplitude value storing area, the average value of these amplitude values is calculated.

The digital signal processor 40 includes an average value arithmetic unit which calculates an average of the amplitude values. The average of the amplitude values is calculated by dividing the sum of the amplitude values stored in the amplitude value storing area by the number of the amplitude value by the average value arithmetic unit. The calculated average is stored in the average value storing area of the digital signal processor 40.

The digital signal processor 40 determines whether or not all of the average values necessary for the calculation are stored in the average value storing area. The average values necessary for the calculation indicate, for example, average values of the continuous sixteen points which are centered around the peak value of the amplitude. The digital signal processor 40 includes a regression calculation unit which performs a well-known quadratic regression calculation when it holds all of the averages necessary for the calculation. The regression calculation unit performs the quadratic regression calculation using the average value calculated by the average value arithmetic unit.

The digital signal processor 40 includes a peak position arithmetic unit which calculates the peak position of the average amplitude value. The peak position arithmetic unit calculates the origin position of the object to be measured based on the peak position of the second signal obtained by the quadratic regression calculation.

As described above, the digital signal processor 40 includes the average value arithmetic unit which calculates the average of the amplitude values of the second signal calculated by the amplitude arithmetic unit 30 for every cycle of the first signal. The digital signal processor 40 also includes the regression calculation unit which performs the quadratic regression calculation using the average value calculated by the average value arithmetic unit. Furthermore, the digital signal processor 40 includes the peak position detector (the measurement part) which calculates the peak position of the second signal to obtain the origin position of the object to be measured.

Thus, the origin defining part can determine the peak position obtained by the peak position arithmetic unit as the origin position of the object to be measured. The memory 7-4 (the register) that is the phase storing part stores the phase of the interference signal obtained from the first light source at the origin position.

The origin defining part in the digital signal processor 40 averages the intensity of the interference signal obtained from the second light source and holds the averaged intensity in the registers $A_1$ to $A_{10}$. Furthermore, the origin defining part performs the quadratic regression calculation for the average value held in the registers $A_1$ to $A_{10}$ and defines the peak position calculated by the regression coefficient of the quadratic regression calculation as the origin position. The configuration of the present embodiment is the same as that of Embodiment 1 except that the method of defining the origin position is different.

Similarly to Embodiment 1, the digital signal processor 40 of the present embodiment includes an origin redefining part. The origin redefining part calculates the origin position using the measurement result measured by the measurement part after the position information of the origin position is cleared, the interference signal obtained from the first light source, and the phase stored in the memory 7-4 as a phase storing part in order to redefine the origin.

As described above, according to the above embodiments, an absolute position measurement apparatus and a measurement method which are capable of reproducibly defining an origin position can be provided. The absolute position measurement apparatus of the present embodiments can accurately measure the origin even if an error is contained in a configuration component of the interferometer. Therefore the absolute position measurement apparatus with high accuracy can be constituted at low cost. A logic arithmetic part can be easily constituted by an LSI. If an operation at high speed is not required, the logic arithmetic part can be realized by software using a microprocessor or a DSP and it can be constituted at lower cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-302652, filed on Nov. 22, 2007, which is hereby incorporated by reference herein in its entirety.

FIELD OF INDUSTRIAL APPLICATION

For example, the present invention is applicable to a laser interferometer which is configured to measure an absolute position of an object to be measured.

The invention claimed is:
1. An interferometer for measuring an absolute position of an object based on an origin point, the interferometer comprising:
a first light source;
a second light source which has coherency lower than that of the first light source; and
a signal processing unit programmed and configured
(a) to obtain (1) a first point where a phase of an interference signal obtained from the first light source coincides with a phase of an interference signal obtained from the second light source and (2) a second point where an intensity of the interference signal obtained from the second light source is maximized;
(b) to define the origin point based on the obtained first and second points;

(c) to store a phase of the interference signal obtained from the first light source at the defined origin point; and
(d) to redefine, if information of the origin point is cleared, the origin point based on (1) the first and second points having been reobtained and (2) a third point where the interference signal obtained from the first light source has the stored phase.

2. An interferometer according to claim 1, wherein the signal processing unit is configured to calculate a difference between a phase of the interference signal obtained from the first light source and the stored phase to obtain the absolute position of the object.

3. An interferometer according to claim 2, wherein the signal processing unit is configured (1) to average a phase difference between the phase of the interference signal obtained from the first light source and the phase of the interference signal obtained from the second light source for each cycle to hold the averaged phase difference in a memory, (2) to perform a linear regression of the held average phase differences to obtain a position where the phase difference is zero, and (3) to define the origin point based on the obtained position.

4. An interferometer according to claim 2, wherein the signal processing unit is configured (1) to average the intensity of the interference signal obtained from the second light source to hold the averaged intensity in a memory, (2) to perform a quadratic regression of the held average intensities to obtain a position where the intensity is peak, and (3) to define the origin point based on the obtained position.

5. An interferometer according to claim 1, wherein the signal processing unit is configured (1) to average a phase difference between the phase of the interference signal obtained from the first light source and the phase of the interference signal obtained from the second light source for each cycle to hold the averaged phase difference in a memory, (2) to perform a linear regression of the held average phase differences to obtain a position where the phase difference is zero, and (3) to define the origin point based on the obtained position.

6. An apparatus interferometer according to claim 1, wherein the signal processing unit is configured (1) to average the intensity of the interference signal obtained from the second light source to hold the averaged intensity in a memory, (2) to perform a quadratic regression of the held average intensities to obtain a position where the intensity is peak, and (3) to define the origin point based on the obtained position.

7. An interferometer according to claim 1, wherein the signal processing unit is configured to redefine the origin point as a point, of a plurality of the third points, nearest to a point defined based on the reobtained first and second points.

8. An interferometer-implemented absolute position measurement method of measuring an absolute position of an object based on an interference signal generated by light from a first light source and an origin point, the method comprising:
   obtaining (1) a first point where a phase of an interference signal obtained from the first light source coincides with a phase of an interference signal obtained from a second light source which has coherency lower than that of the first light source and (2) a second point where an intensity of the interference signal obtained from the second light source is maximized;
   defining the origin point based on the obtained first and second points;
   storing a phase of the interference signal obtained from the first light source at the defined origin point; and
   redefining, if information of the origin point is cleared, the origin point based on (1) the first and second points having been reobtained and (2) a third point where the interference signal obtained from the first light source has the stored phase.

9. A method according to claim 8, wherein the origin point is redefined as a point, of a plurality of the third points, nearest to a point defined based on the reobtained first and second points.

* * * * *